United States Patent [19]
Schneider et al.

[11] 3,721,574
[45] March 20, 1973

[54] SILICATE COATINGS COMPOSITIONS
[76] Inventors: Robert H. Schneider, 3639 Grennoch, Houston, Tex. 77024; John B. Schutt, 2403 Peach Stone Ct., Silver Spring, Md. 20904
[22] Filed: Aug. 6, 1968
[21] Appl. No.: 750,461

[52] U.S. Cl. ................................. 106/74, 106/84
[51] Int. Cl. ........................................ C09d 1/04
[58] Field of Search ............... 106/74, 84, 84 M

[56] References Cited

UNITED STATES PATENTS

| | | | |
|---|---|---|---|
| 2,807,552 | 9/1957 | Robinson et al | 106/74 |
| 2,905,562 | 9/1959 | Brown | 106/74 |
| 3,130,061 | 4/1964 | McMahon et al | 106/84 M |
| 3,492,137 | 1/1970 | Iler | 106/84 |
| 3,493,401 | 2/1970 | Schutt et al | 106/84 |

Primary Examiner—James E. Poer
Attorney—Arnold, Roylance, Kruger & Durkee, Tom Arnold, Donald C. Roylance, Walter Kruger, Bill Durkee, Frank S. Vaden, III and John F. Lynch

[57] ABSTRACT

Water resistant and air-drying alkali metal silicate coatings contain a base of an alkali metal silicate solution having a high molar ratio of solvated silica to alkali metal oxide. To this base is added colloidal silica in amounts to increase the $SiO_2$:alkali metal oxide mole ratio to as high as 9:1. The compositions are advantageously modified with silane wetting agents and multivalent metal ions, e.g., calcium. Ultimately, the coatings may be modified with various materials such as tetrafluoroethylene polymer or zinc.

10 Claims, No Drawings

SILICATE COATINGS COMPOSITIONS

RELATED APPLICATIONS

This application contains subject matter similar to the subject matter of U.S. application Ser. No. 750,457 entitled "Two-Pot Silicate Coatings Compositions" filed on Aug. 6, 1968, now U.S. Pat. No. 3,615,781.

BACKGROUND

The instant invention relates to novel alkali metal silicate coating compositions. More specifically, this invention provides air drying, water resistant alkali silicate coatings containing high concentration ratios of $SiO_2$ primarily as orthosilicic acid and alkali metal salts thereof and colloidal silica. The compositions of this invention are particularly characterized by high concentration amounts of silica with high molecular hydration, i.e., $SiO_2 \cdot n\ H_2O$ where $n$ is greater than or equal to 2. The colloidal silica used herein is not ordinarily molecularly hydrated but is characterized by surface hydration.

In a particular embodiment, this invention provides novel polytetrafluoroethylene coating compositions having a silicate base. In another particular embodiment, there are provided novel zinc coatings having a silicate base.

Aqueous alkali metal silicate coatings are recognized as providing good heat-resistant and abrasion-resistant surfaces for a variety of substrate materials. However, one difficulty with alkali metal silicate coatings in the past has been that the coating films were somewhat porous and were susceptible to be rapidly and readily attacked by alkaline mediums and slowly attacked by water itself.

Also, typical alkali metal silicate coatings are characterized in that they are usually exclusively baked-dry finishes, and consequently, they have not found utility in those applications where air drying is prerequisite.

One particular area where alkali metal silicate coatings have been employed is in liquid modified polytetrafluoroethylene coatings. Here again, the water sensitivity of the silicate base has rendered the coating susceptible to aqueous attack. Not only does this effect the overall integrity of the coating but also adversely effects the polytetrafluoroethylene polymer in the coating.

SUMMARY OF THE INVENTION

Accordingly, there is provided by the instant invention novel alkali metal silicate coatings which are air dryable to form noncracking surfaces on a substrate.

There is also provided by the instant invention novel alkali metal silicate compositions having improved resistance to attack by water.

There is further provided by the instant invention novel alkali metal silicate compositions modified tetrafluoroethylene polymer to provide nonstick and chemically resistant properties.

There is further provided by the instant invention zinc coatings having an alkali metal silicate base which coatings contain a high percentage of zinc.

There is further provided by the instant invention an alkali metal silicate formulation which may be used as a base for a multitude of coatings in heat-resistant, corrosion-resistant, and water-resistant applications.

Other advantages and attributes of the novel compositions of this invention will be apparent from the ensuing application and claims.

The composition of this invention are aqueous coating compositions which comprise a highly molecularly hydrated alkali metal silicate, colloidal silica to form an aqueous dispersion in said silicate having an overall ratio of $SiO_2$ to alkali metal oxide of about 5-to-1 or more, and having a pH in the range of between 10 and 11. The compositions of this invention can also advantageously include other constituents such as wetting agents, insolubilizers for the silica, bulking agents, opacifiers, and additives such as tetrafluoroethylene polymer.

The inorganic silicate coatings of the instant invention find many and varied uses. For example, a bake-dry clear coating in accordance with this invention demonstrates excellent adhesion to a variety of substrates and can serve as a fireproof satin glaze coating for ceramics or metals. The polytetrafluoroethylene-modified coatings provide corrosion-resistant, nonstick coatings which can be used to coat a variety of surfaces to prevent corrosion or to prevent sticking. Thus, for example, these can be used to provide non-icing surfaces on airplanes since they demonstrate excellent adhesion to the substrate and good nonstick properties. The polymer-modified coatings in accordance with this invention are limited in temperature resistance virtually only by the temperature which the polymer in the coating will tolerate. Thus, the high temperature resistance of polytetrafluoroethylene enables the coatings containing this polymer to withstand fairly high temperatures, almost to 1,000 ° F. If polyethylene is employed as the polymer in the coating the temperature limits to which the coating could be subjected would be lower because of the temperature limitations inherent in the polymer.

Other additive materials may be used in the coatings of the instant invention as well. For example, stainless steel flakes in the coating gives chemical resistance. An effective corrosion-resistant coating can be formulated with stainless steel and polytetrafluoroethylene, in which coating the polymer ingredient appears to make the coating more flexible and less subject to cracking upon flexure of the substrate.

The addition of finely divided mica to tee coatings of this invention results in a hard coating which has excellent bridging characteristics and can be used to cover porous surfaces such as concrete block or the like.

Another extremely useful coating can be formulated by adding zinc dust to the compositions of this invention. Such a coating is excellent for galvanizing a variety of surfaces.

Most of the coatings of this invention demonstrate excellent adhesion and can be applied without primer to a variety of surfaces such as wood, stone or ceramic, metal or porous substrates such as foam or fiberboard. The coatings are water resistant and can be rendered fireproof and hence will find a variety of utilities as will be obvious to those skilled in the art.

DESCRIPTION OF THE SPECIFIC EMBODIMENTS

The compositions of the instant invention are formulated by adding colloidal silica to an alkali metal silicate solution in such amount so as to control the pH of the overall mixture to inhibit the coordination of the silica in the mixture, which coordination can result in the formation of agglomerates and can destroy the nature of the coating. Furthermore, the coatings of this invention are preferably modified by the addition of small amounts of a hydrocarbyl silane wetting agent and by addition of multivalent ions such as calcium ions to the coating, the latter to effect a coordination of the silica on a substrate once the mixture is applied as a coating.

In accordance with the specific embodiment of this invention, tetrafluoroethylene polymer, or other organic polymers can be added to the compositions of the instant invention to provide properties such as chemical resistance and the like.

It is also within the purview of the compositions of the instant invention to use a variety of bulking agents and/or pigments to obtain the desired degree of opacity or to contribute hardness, chemical resistance or the like.

Any aqueous solution of an alkali metal silicate or mixtures thereof may be employed in connection with this invention. Such alkali metal silicate solutions are widely available commercially and are commonly identified by the molar ratios of $SiO_2$ to alkali metal oxide. These ratios commonly range from about 1-to-1 to as high as 3.9-to-1. Virtually any of these commercially available alkali metal silicates may be employed, although it will become apparent herein that the preparations having a high molar ratio of $SiO_2$ to alkali metal oxide will be preferred inasmuch as the silicate compositions of this invention possess high $SiO_2$ to alkali metal oxide ratios. Thus, in those instances wherein a lower molar ratio alkali metal silicate solution is used, it will become necessary to raise the molar ratio of $SiO_2$ to alkali metal oxide according to methods prescribed herein.

Most preferably, the suitable water-soluble alkali metal silicates include lithium silicate, potassium silicate, and sodium silicate.

The alkali metal silicate solutions which form the base of the novel compositions of the instant invention are characterized by high molar ratios of silica in solution to alkali metal oxide. Herein alkali metal oxides generically may be expressed as $M_2O$. Most commonly available alkali metal silicate solutions provide an $SiO_2:M_2$ molar ratio no greater than about 3.5-to-1 or 4-to-1.

In accordance with this invention, the alkali metal silicate solution is preferably upgraded in its solvated or hydrated silica content prior to the addition of any colloidal silica content of the solution is by addition of metasilicic acid (also referred to as monosilicic acid) which is ideally represented by the formula $SiO_2 \cdot H_2O$. However, metasilicic acid, for example, in a form wherein about 85 percent by weight is $SiO_2$ is suitable. Preferably, metasilicic acid is added to the alkali metal silicate solution in an amount sufficient to increase the $SiO_2:M_2$ molar ratio to the desired level which will vary depending upon the formulation being prepared as will be apparent hereinafter. When dealing with solutions of sodium or potassium silicate, this ratio of solvated silica to alkali metal silicate in the alkali metal silicate solution may be desirably increased to as high as 5.4-to-1 or 5.5-to-1. In the case of lithium hydroxide, a considerably higher ratio of silica to lithium oxide, up to 6.4-to-1, can be used.

At the above high ratios of silica to alkali metal oxide, the silica solution is postulated to be effectively fully hydrated. Such high content silica solutions wherein the silica is substantially fully hydrated or fully hydrated are desirably employed in certain compositions in accordance with this invention, particularly the zinc-modified coatings.

It will be often found that to fully hydrate the silica in an alkali metal silicate solution, it will be necessary to decrease the concentration of silica and alkali metal silicate with respect to the aqueous medium in which these materials are maintained. For example, potassium silicate is conveniently available in a 35 percent by weight solution having an $SiO_2:K_2O$ molar ratio of 3.3. However, to provide a molar ratio of 5.4 between the silicon dioxide and the potassium oxide, the concentration of the silicate is desirably decreased to about 20 to about 24 or 25 percent by weight alkaline metal silicate.

In accordance with a first embodiment of this invention, there are provided alkali metal silicate coatings which may be modified in a variety of ways such as by addition of polytetrafluoroethylene.

In these compositions, an alkali metal silicate solution is treated with a colloidal silica sol to produce a mixture having an $SiO_2:M_2O$ ratio of up to about 6:1 or even as high as 6.5-to-1. Wetting agents and a multivalent contributor also form part of these compositions.

In preparing these compositions in accordance with this first embodiment of the invention, an alkali metal silicate solution having a mole ratio of up to about 3:1 to about 4:5 is used. Hence metasilicic acid is not added in amounts to increase the $SiO_2:M_2O$ mole ratio greater than about 4.5:1 and preferably the alkali metal silicate solution has an $SiO_2:M_2O$ ratio of about 4:1 or less. If metasilicic acid is added in amounts to increase the mole ratio beyond these limits, the ultimate coatings become brittle and susceptible to cracking.

To the alkali metal silicate solution having an $SiO_2:M_2$ molar ratio preferably between 3:1 and 4:1, colloidal silica is added to the solution to further increase the silicon dioxide to alkali metal oxide molar ratio. In the polytetrafluoroethylene-modified compositions of this invention and related coatings, this ratio can be increased to as high as about 6-to-1 or 6.5-to-1. Preferably sufficient silica is added to increase the $SiO_2:M_2$ ratio to at least 5-to-1.

Colloidal silica which may be added to the alkali metal silicate solution in accordance with this invention is conveniently available in the form of an aqueous dispersion. Typically, a 50 percent dispersion of silica in water may be used. However, particularly preferred in the coating compositions of this invention is a colloidal silica sol wherein the silica has a surface coating of aluminum oxide ($Al_2O_3$). The amount of aluminum oxide on the silica is extremely small ranging from about 0.0025 to 0.010 moles of aluminum oxide per mole of silica.

The use of an aluminum oxide-modified silica in the compositions of this instant invention has been found to be particularly advantageous. The slight modification of the silica in this manner appears to inhibit cracking in the ultimate composition and promote good adhesion properties in the coating. Furthermore, in those specific embodiments of this invention wherein tetrafluoroethylene polymer or other polymer is added to the coatings, the use of aluminum oxide-modified silica aids greatly in achieving a good dispersion of the polymer particles throughout the coating.

In accordance with a still further aspect of this invention, a hydrocarbon-modified silica, or a "hydrophobic" silica may be added to the alkali metal silicate solution together with the aluminum oxide modified-silica. This hydrophobic silica typically is identified by the presence of oxyalkyl groups, typically oxymethyl groups pendent from the coordinated silicon dioxide chain. A suitable hydrophobic silica is available from DeGussa Chemical Co. under the designation R-972.

The use of aluminum oxide-modified silica with and without hydrophobic silica in the compositions of this invention preserves the "wet edge" of the coatings. If after the coatings are applied, there is a rapid loss of water from the coatings, the coatings tend to crack. It is postulated that this occurs because an overly rapid coating shrinkage occurs before the silicon dioxide in the coating is well coordinated.

This material acts as a thickener and often additional water must be added at the time of addition of the aluminum oxide-modified silica to obtain the desired consistency in the coating formulation.

The hydrophobic silica is postulated to operate in a different manner. Because of the aqueous water base to the instant coatings, the hydrophobic alkyl portion of the hydrophobic silica may "float" to the surface of the coating. Its hydrophobic nature would tend to inhibit the loss of surface water since it would repel the progress of water to the coating surface.

Most preferably, the colloidal silica employed in the polytetrafluoroethylene-modified coatings and related coatings of this embodiment is modified with $Al_2O_3$. This may be used with amounts of hydrophobic silica. Usually the aluminum oxide-modified silica constitutes about 80 percent by weight of the silica added. Similar small amounts of an unmodified colloidal silica might also be added if desired. Also, the addition of small amounts of hydrophobic clay can be undertaken to preserve the coating, "wet edge."

An extremely important parameter in the determination of the amount of the modified colloidal silica to be added is the overall pH of the mixture after the addition of the silica. The alkali metal silicate solution prepared as above will generally have a pH in the range of from about 11 to about 13 due to the strong alkalinity of the alkali metal oxide. The addition of colloidal silica will usually reduce the pH of the silicate solution.

At a high pH of 12 or 13, the mixture of silica in alkali metal silicate solution having a high ratio of $SiO_2:M_2$ as provided herein tends to be unstable. The silica tends to coordinate and form agglomerates destroying the fluid nature of the mixture. Consequently, it is highly desirable that sufficient colloidal silica of the types disclosed above be added to the alkali metal silicate to lower the pH sufficiently to prevent coordination of the silica and give the mixture a reasonably long shelf life. Thus in accordance with this invention, colloidal silica as above is added to the alkali metal silicate in an amount to preferably reduce the overall pH of the mixture to about 11 or less. A lower pH ranging down to a pH of about 10 is highly desirable, inasmuch as it appears that the stability of the mixture increases as the pH of the mixture decreases.

The mixture of the alkali metal silicate solution and the colloidal silica as described above together form the basic binder or vehicle of all the coatings of this invention. This mixture is maintained in an aqueous medium. In this mixture, the overall "solids" content of the basic vehicle is related to the stability of the mixture. By solids content in this usage is meant the total amount of alkali metal silicate and silica in the aqueous medium.

As mentioned above, alkali metal silicate solutions having about 3.3-to-1 $SiO_2:M_2O$ ratio are available in solutions containing about 35 percent by weight alkali metal silicate. If metasilicic acid is added to upgrade the $SiO_2:M_2O$ ratio to 4.5-to-1 or more, it is also preferable to add water so that the solution remains stable, and by such water addition reduce the alkali metal silicate content to less than 30 percent by weight down to about 25 percent by weight.

Similarly when the colloidal silica is added, care must be taken to assure that the combined alkali metal silicate and silica concentration is not so high as to render the mixture unstable and result in the formation of agglomerates. Water is usually a necessary addition with the silica. Although the stable concentration of silicate and colloidal silica will vary depending upon the system, generally the content of silicate and colloidal silica is not greater than 35 percent and preferably not greater than about 30 or 32 percent by weight, and typically the vehicle is diluted with water to about 25 percent solids.

It will be recognized that in higher concentrations, the alkali metal silicate will produce a higher pH in the mixture and hence result in instability. Thus it may be necessary to add water to the mixture to bring both pH and concentration into line when formulating this basic vehicle for the coatings of the instant invention.

As stated above, the mixture of alkali metal silicate solution and colloidal silica forms the basic vehicle of the coatings of this invention. As will be seen by further discussion below the vehicle may also include a wetting agent, and a multivalent metal coordinator.

The further materials used in these novel coatings such as bulking agents, pigments, finely divided polymer, zinc dust, stainless steel flakes or the like constitute additives to the basic vehicle for formulating a coating for a particular end use.

The relative amounts of alkali metal silicate solution and colloidal silica employed in the unbulked vehicle are best determined from the parameters of pH and from overall desired $SiO_2:M_2O$ ratio as discussed above. Based upon unbulked base material, the alkali metal silicate solution is typically present in amounts varying from 25 to about 60 percent by weight. The colloidal silica then comprises about 2 to about 20 percent by weight of the unbulked base material. The remainder of the unbulked vehicle is made up of water, silane wetting agent, and material contributing multivalent ions for coordinating the silica.

It has been found that silane wetting agents are singularly useful additions to the vehicles of this invention inasmuch as they provide the desired wetting characteristics for the bulking agents and yet do not destroy the water insolubility of the ultimate compositions after they are cured. The silane wetting agents are particularly useful in the tetrafluoroethylene-modified coatings wherein they function to wet in the tetrafluoroethylene polymer.

The silane wetting agents of this invention preferably include the difunctional or trifunctional silanes such as the hydrocarbon or oxyhydrocarbon alkoxy silanes or the quadrifunctional silanes alkoxy wherein the hydrocarbyl or oxyhydrocarbyl group contains an oxirane oxygen function.

Typically preferred among the difunctional and trifunctional silane wetting agents are the alkyl alkoxy silanes including dimethyl dimethoxy silane, methyl trimethoxy silane, ethyl trimethoxy silane; isopropyl trimethoxy silane, methyl triethoxy silane and the like; the aryl alkoxy silanes, including phenyl trimethoxy silane or alkyl phenyl trimethoxy silanes; the oxyhydrocarbyl silanes such as methoxy ethyl trimethoxy silane and the like. Quadrafunctional silanes include those which also include an oxirane oxygen on the hydrocarbyl group, e.g., gamma-glycidyloxypropyltrimethoxy silane.

The trifunctional silanes have the function of wetting in the additives or bulking agents added to the coating composition. Particularly in the tetrafluoroethylene polymer-modified coatings the silane greatly assists in making the polymer particles water wet. The quadrifunctional silane wetting agents are not so efficient as wetting agents because of the longer hydrocarbon chain pendent thereon. However, the additional reactive site provided by the oxirane oxygen group appears to result in an increased amount of cross-linking which improves hardness of the ultimate coating. Accordingly, mixtures of trifunctional and quadrifunctional silane wetting agents can be used. It will be apparent to those skilled in the art that the smaller are the alkyl substitutents on the silanes of this invention the more water soluble will be the wetting agent. Accordingly, such short chain hydrocarbon silanes are preferred particularly in the polytetrafluoroethylene coatings. If talc or stainless steel flakes are added to the coating rather than polytetrafluorethylene, longer chain alkyl silanes may be used.

The silanes also improve the adhesion of the instant coatings and hence they are preferred in the compositions herein disclosed, though they are most preferred in the tetrafluoroethylene polymer-modified coatings. Silane wetting agents are added in small amounts sufficient to wet in the solid material to be added in the coating and to provide the desired wet edge. The silane is preferably added prior to the material it is to wet in, the addition being accomplished with agitation. Agitation should be continued from 3 to 10 minutes to permit the silane to come to equilibrium with the system. It is postulated that a hydrolysis of the silane occurs upon its addition which requires this short period of time. Typically the amount of silane will vary from about 2 to 15 percent by weight of the unbulked vehicle. The unbulked vehicle refers to the coating prior to addition of pigments, opacifiers, bulking agents and the like.

A further modification which may be introduced into the coatings of this invention to promote film integrity and water resistance is the addition of a multivalent metal ion into the vehicle. The addition of a multivalent metal ion to the composition is particularly preferred as the $SiO_2:M_2O$ ratio of the compositions of this embodiment approaches 6-to-1. The multivalent ion appears to crosslink these high mole ratio coatings and avoid cracking.

During the addition of the multivalent metal ion, temperature of the vehicle is maintained at about ambient level since at elevated temperature, the multivalent ions may be leached from the additive material adversely effecting the coating. For example, the addition of calcium ions to the compositions of this invention may be accomplished in the form of an additive such as wollastonite. The multivalent nature of the calcium ions permits them to coordinate the silicon atoms in the coating in a manner not accomplished by monovalent metal ions such as the alkali metals. Magnesium ions may be introduced with similar effect, using for example, talc as an additive to the compositions of this invention. Other additions may, of course, be used as will be apparent to those skilled in the art to introduce such other multivalent ions as lead, iron, and antimony. Of course, the wollastonite and talc can also serve as bulking agents and perform an opacifying function in the coating.

The amount of wollastonite or talc to be added to the composition of this invention to provide coordinating multivalent ions will depend upon both the silica content of the coating and the amount of coordination desired to be accomplished. Generally, in the case of wollastonite, up to about 12 percent by weight based upon the unbulked base material may be used in polytetrafluoroethylene-modified coatings. However, the amount employed is not critical inasmuch as wollastonite or talc or like materials containing multivalent ions may also be used to contribute bulking properties to the coatings.

In accordance with one embodiment of this invention, the coating compositions herein may be modified by the addition of polytetrafluoroethylene to the composition. Polytetrafluoroethylene is added in finely divided form, customarily as a polymer suspensoid in water. In accordance with this invention, polytetrafluoroethylene may be added to the instant novel composition in amounts ranging up to as high as 70 percent by weight.

The novel polytetrafluoroethylene-modified compositions of this invention may be air-dried or may be bake-dried. Of course, it will be appreciated that to obtain fusion of the polytetrafluoroethylene across the surface of the substrate a bake-drying technique must be employed.

Typically, the polytetrafluoroethylene-modified coatings of this invention are first permitted to air dry and then are sintered or fused at high temperatures of from about 625° F to 800° F.

In accordance with this invention, the polytetrafluoroethylene suspensoid which is added to the coating composition of this invention may be prepared with a silane wetting agent as disclosed above in water. In the alternative, finely divided aqueous polytetrafluoroethylene may be added directly to unbulked base vehicle containing sufficient silane and water to accommodate the polytetrafluoroethylene to be added.

In a particular preferred aspect, fusion of the coatings can be aided and facilitated, and a smooth coating can be obtained by overcoating the polytetrafluoroethylene polymer coating formulated as above with formamide or an oligomer or suspension of polytetrafluoroethylene in formamide prior to baking.

Such an overcoating can contain up to 50 percent by weight of the polymer.

It will also be appreciated by those skilled in the art that other organic polymers may be employed to modify the novel compositions of the instant invention. For example, if chemical resistance were desired, polyethylene might be added to the novel silicate base material and once again the film could be baked to effect a flowing of the polyethylene to obtain a polyethylene-modified coating. Similar modification with other thermoplastics such as the polyamides will be obvious to those skilled in the art.

Other related coatings may be formulated that do not contain polymer at all. Thus for example by addition of bulking agents such as talc, suitable clays, or the like, and pigments such as titanium dioxide or ferric oxide a multitude of coatings may be prepared.

One particularly preferred coating may be prepared by addition of finely divided mica to the unbulked vehicle in amounts ranging to 70 percent by weight, usually in amounts of 10 to 50 percent by weight. A coating so prepared will be hard and demonstrate excellent fire-resistant properties. The coating also demonstrates excellent bridging characteristics and can be used to obtain a smooth coating film on irregular surfaces such as concrete block or brick. This bridging characteristic, together with the fire-resistance of these coatings, also make them excellent for coating polyurethane foam to render it fire-resistant.

These compositions may also be modified by the addition of other material such as stainless steel flakes, aluminum powder, molybdenum disulfide, or the like to obtain desired ultimate properties in the coating. When such metallic additives are employed, it is preferred that the stainless steel or aluminum powder be surface-coated with stearic acid or a like soap or oleoresinous material to assist the wetting of the material.

It should be pointed out that the novel coating compositions of the instant invention are air-drying when they are sufficiently bulked with tetrafluoroethylene polymer, or zinc, or stainless flakes, or a like bulking agent. However, the unbulked base material of this invention of itself provides a novel bake-dry coating material which is characterized by a high ratio of $SiO_2:M_2$ and hence offers good properties of hardness and heat resistance. This unbulked vehicle can provide a glaze of satin finish for a variety of substrates.

The bulked coatings in accordance with this embodiment are air-drying, though they may be bake-dried if desired. The shelf life of these compositions is excellent, particularly the polytetrafluoroethylene-modified coatings.

In accordance with another embodiment of this invention, the instant compositions may be modified by the addition of zinc dust to the unbulked base material to produce a zinc-modified coating. These coatings are formulated in a slightly different manner. In the zinc-modified coatings of this invention, the zinc may be employed in extremely high proportions to result in formation of a film containing as high as about 95 or 96 percent by weight of zinc in the dried coating. Thus in the coating composition, the zinc may constitute up to 70 percent by weight, including the water in the composition. It will be appreciated that zinc coatings of this nature are not required to have extremely good film integrity inasmuch as the zinc in the coating acts as a sacrificial metal to protect the substrate.

In preparation of the zinc-modified coatings in accordance with this invention, it is preferred to provide an alkali metal silicate solution containing a very high proportion of solvated silica. Thus, metasilicic acid is preferably added with accompanying addition of water to the alkali metal silicate solution in amounts sufficient to provide an overall $SiO_2:M_2O$ ratio of greater than 5:1. When sodium or potassium are the alkali metals present in the solution the $SiO_2:M_2O$ mole ratio may be increased to about 5.5 or 5.6-to-1. The solution may be upgraded to an $SiO_2:M_2O$ ratio of 6-to-1 when a lithium silicate solution is used.

Then sufficient colloidal silica is added to further increase the $SiO_2:M_2O$ ratio to as high as 9-to-1. At this high mole ratio, water must also be added so that generally the "solids" content in the vehicle is less than 25 percent by weight, typically 19 to 21 percent by weight.

In the zinc-modified coatings of the instant invention preferably nonmodified colloidal silica is employed for addition to the alkali metal silicate solution. Thus a colloidal silica sol typically 50 percent by weight in water is used. Small amounts of aluminum oxide-modified silica to contribute hardness, or hydrophobic silica may be added, but usually not in amounts exceeding about 10 percent by weight of total amount of silica added to the silicate solution.

As in the coatings discussed above, the pH of the mixture after adding colloidal silica should be maintained at less than about 11. Also, the solids content is maintained at about 20 percent as mentioned above. Observance of these parameters assure the stability of the vehicles for the zinc-modified coatings as with the coatings of the first embodiment herein.

With respect to the zinc-modified coatings, it should be noted that indeed no colloidal silica at all need be added. The reactivity of the zinc enables upgrading the alkali metal silicate solution to an $SiO_2:M_2O$ ratio of 5.5 or 6-to-1. This is sufficiently high to enable a coating to be prepared without addition of colloidal silica. Colloidal silica is preferably added to further increase the $SiO_2:M_2$ ratio however.

The use of a silane wetting agent with the zinc-modified coatings of this invention is not necessary as with prior coatings herein wherein the silane wets in the bulking agents. Perhaps this is due to the high percentage of zinc in the coatings herein and because of its reactivity. Use of $Al_2O_3$ modified silica in part can assist as a wetting aid when silane is not used. However, use of the silanes in percentages as disclosed above with the zinc-modified coatings results in a smoother coating. Also the silanes appear to improve the adhesion of all the coatings in which they are used.

When the zinc-modified films in accordance with this invention are applied, the finely divided zinc reacts with the variously hydrated silicon dioxide along with the salts thereof in the coating coordinating the silicon network. It is furthermore postulated that the zinc crosslinks the silicon network. Accordingly, it has been found that when zinc-modified coatings in accordance with this invention are formulated, very high ratios of $SiO_2:M_2$ may be employed, up to as high as 9-to-1.

It should be pointed out that even in the tetrafluoroethylene polymer-modified coatings of this invention and related coatings above, if the amount of tetrafluoroethylene polymer is maintained less than about 40 or 50 percent by weight of the entire composition and sufficient amounts of other bulking agents which contain multivalent coordinating ions such as calcium or magnesium ions are employed, that in these compositions as well the $SiO_2:M_2O$ ratio can be increased higher than about 6-to-1. Accordingly, the presence of increased amounts of multivalent ions which can crosslink and coordinate the silicon network render the formulations of the instant invention increasingly capable of tolerating very high $SiO_2:M_2O$ molar ratios.

The zinc dust is added to the vehicle material at the time of use. If necessary, additional water may also be added to obtain the desired consistency. Because of the high reactivity of zinc, the zinc-modified coatings cannot be completely prepared in advance as are the polytetrafluoroethylene-modified coatings. Rather the zinc dust is added shortly before use. Following addition of the zinc dust the composition is agitated and permitted to stand for a short time, about 1 hour or 2, prior to application; the coating, once zinc is added, will not have a shelf life over about 24 to 48 hours.

It will be apparent to those skilled in the art that the novel coatings of this invention may be readily modified in manners not explicitly disclosed. For example, if desired, a standard organic wetting agent such as a polyethylene glycol ether of an alkylated phenyl may be employed in place of the silane wetting agents disclosed. Also, a variety in mixture of bulking agents may be used in a single composition. For example, an excellent hard nonsticking chemically resistant composition may be advantageously formulated using both tetrafluoroethylene polymer and stainless steel flakes in a coating composition in accordance with this invention.

Furthermore, it will be appreciated that various types of colloidal silica other than those specifically mentioned may be employed to produce a coating material having a high $SiO_2:M_2O$ ratio.

In formulating the basic vehicle of the coatings herein it will be appreciated that the vehicle contains both dissolved and suspended $SiO_2$. Thus when metasilicic acid is added to an alkali metal silicate solution, the result will be primarily a solution. When colloidal silica is added, modified or not, for the most part it remains in suspension.

Also, although the oppositions of this invention are disclosed to be air-dry compositions, no adverse effects accrue if the compositions are bake-dry so long as the drying operation is not so rapid as to produce cracking. Generally, it is advantageous to bake-dry the compositions at a temperature between about 100° F and 250° F.

The compositions of this invention may be utilized to coat a variety of substrates including metal, glass, plastic, wood, and ceramic materials such as stone or brick. Usually the compositions of this invention are employed to produce a film thickness between about 1 and 25 or 30 mils. However, the thickness which may be employed will depend heavily upon the amount of bulking agent introduced into the composition.

The compositions of this invention may be brushed, sprayed, or bladed onto a substrate. Viscosity of the coatings herein can be readily altered by varying the water content without adversely affecting the coating qualities. Although the greater the amount of water in the compositions herein the greater is the likelihood that bake-drying will be necessary.

The following Examples are illustrative. In the following Examples, a number of suitable formulations are set forth to illustrate the compositions of this invention.

EXAMPLE 1

To 200 grams of a 35 percent by weight solution of potassium silicate in water having an $SiO_2:K_2O$ ratio of 3.3:1, there is added 29 grams of colloidal silica having a nominal $Al_2O_3:SiO_2$ mole ratio of 0.005:1, along with 160 grams of water. The resultant mixture has an $SiO_2:K_2$ mole ratio of 5.3:1 at a solids content of 25.4 percent ("solids content" being the amount of potassium silicate and silica in the mixture). The mixture containing both dissolved and suspended $SiO_2$ is bulked by addition of 64 grams of wollastonite followed by 51 grams of finely divided tetrafluoroethylene polymer. Next 20 grams of methyl trimethoxy silane are added with stirring. An additional 51 grams of tetrafluoroethylene polymer and 36 grams of stainless steel flakes are added to complete the bulking of the coating.

Other compositions may be prepared as above in Example 1 by substituting 20 grams of talc in place of the stainless steel flakes. A lubricated surface can be obtained with the composition of Example 1 where the stainless steel is replaced by 18 grams of molybdenum disulfide.

The above compositions will be air drying. A smooth surface can be obtained by permitting the composition of Example 1 to air dry and then applying an overcoating of a suspension of about 50 percent tetrafluoroethylene polymer in formamide. The overcoated sample is then heated in an oven to 750° F to fuse the polymer in the coating.

EXAMPLE 2

A coating is prepared as in Example 1. Following the addition of the stainless steel flakes, 20 grams of talc are admixed into the composition.

This composition was brushed on a 2 × 4 inch steel panel and permitted to air dry under ambient conditions for a week. The coated portion of the panel was exposed to sulfuric acid for 3 hours. After removal of the sulfuric acid visual inspection showed no adverse effects on the coating. The same panel was then immersed in water for two days. Upon removal there appeared no adverse effects.

EXAMPLE 3

Another coating composition in accordance with Example 2 was prepared and applied to a 2 × 2 inch panel of steel in a film thickness of about 5 to 8 mils. The panel was nailed to a piling just above the splashline at Matagorda Bay at Matagorda, Texas. The panel was left for 3 weeks. The painted surface showed no adverse effects whatsoever after removal.

A similarly prepared panel out of the same batch was heated in an oven to 1,000° F and showed no adverse effect.

A further coating composition in accordance with Example 2 was prepared and applied to a steel plate, cold rolled steel measuring 2 × 4 inch which had been sandblasted. The coating was applied to the sandblasted surface. After air drying for about 2 days, the coated panel was placed over a propane torch. At an extremely high temperature which was not recorded, the polytetrafluoroethylene in the coating began to visibly burn and the coating was destroyed.

A composition having improved bridging properties can be prepared by substituting 20 grams of finely divided mica for the talc in the composition of Example 2.

The coatings compositions above each can be modified to provide a longer wet edge by addition of 4 grams of hydrophobic silica having pendent oxymethyl groups or by addition of about 3 grams of hydrophobic clay. The hydrophobic clay, in addition to preserving wet edge has good oil absorption and inhibits the silane wetting agent from autopolymerizing.

EXAMPLE 3

To 200 grams of a 35 percent by weight potassium silicate solution having $SiO_2:K_2O$ mole ratio of 3.3:1, there is added 29 grams of colloidal silica having about an $Al_2O_3:SiO_2$ mole ratio of 0.005:1 along with about 300 grams of $H_2O$. The resultant mixture has an $SiO_2:K_2$ mole ratio of 5.3:1 at a solids content of 18.8 percent by weight. Bulking the mixture is completed by the addition of 50 grams of tetrafluoroethylene polymer. Next 20 grams of methyltrimethoxy silane are added followed by 200 additional grams of tetrafluoroethylene polymer.

This composition of Example 3 may be further modified by addition of stainless steel flakes, of aluminum flakes (in small amounts, about 5 grams) or of molybdenium disulfide. The wet edge of the coating can be increased by adding 4 grams of hydrophobic silica. The hardness of the coating can be improved by adding a small amount of quadrifunctional epoxy silane such as $\gamma$-glycidyloxypropyltrimethoxy silane in an amount of about 2 grams. A multivalent metal ion may be introduced by addition of wollastonite.

EXAMPLE 4

To 200 grams of a 35 percent by weight potassium silicate solution having $SiO_2:K_2O$ mole ratio of 3.3:1, there are added 40 grams of colloidal silica having a nominal $Al_2O_3:SiO_2$ mole ratio of 0.005:1 along with 350 grams of $H_2O$. The resultant mixture has a mole ratio of 6.1:1 at a solids content of 18.7 percent. Bulking the mixture is completed by adding 50 grams of finely divided tetrafluoroethylene polymer followed by 16 grams of methyltimethoxy silane. After the silane monomer is fully hydrolyzed, 52 additional grams of the same polymer material are added. To this combination are added 24 grams of stainless steel flakes.

EXAMPLE 5

A coating mixture is prepared as in Example 4 except 33 grams of talc are added in place of the stainless steel flakes. To obtain improved wet edge 4 grams of hydrophobic silica is added. To obtain further crosslinking 5 grams of wollastonite are added with the 33 grams of talc.

All the compositions shown in Examples 4 and 5 were prepared and sprayed on aluminum panels. The panels were exposed to a sodium hydroxide solution with a pH of 9 without adverse effect. Also the panels were subjected to the action of concentrated nitric acid, concentrated sulfuric acid and concentrated hydrochloric acid without adverse effect to coating on substrate.

EXAMPLE 6

To 100 grams of a 35 percent by weight solution of potassium silicate having an $SiO_2:M_2O$ mole ratio of 3.3:1 are added 18.8 grams of silicic acid (meta silicic acid) wetted with 40 grams of water prior to addition to the silicate solution. Gradually additional water is added until a total of 135 grams of water has been added. The resultant composition has an $SiO_2:K_2O$ mole ratio of 5.5 and is 20 percent by weight solids. To this composition are added 8 grams of a polyfunctional alkoxy silane, e.g., methyltrimethoxy silane, phenyl trimethoxy silane, $\gamma$-glycidoxy-propyltrimethoxy silane, and 1,080 grams of zinc dust. This coating dries to give a film with a dry film zinc content of 94–95 percent.

EXAMPLE 7

To the composition of Example 6 are added 125 grams of a 20 percent silica sol to give a binder $SiO_2:K_2$ mole ratio of 9. With the arymented $SiO_2:K_2O$ mole ratio, an additional 500 grams of zinc dust are added.

The above compositions may be modified by addition of about 10 grams of hydrophobic silica together with additional water to impart an improved wet edge.

EXAMPLE 8

To 100 grams of a 37 percent solution of sodium silicate having an $SiO_2:Na_2O$ mole ratio of 2.6, e.g., 2.6:1, are added 36.4 grams of metasilicic acid wetted with 70 grams of water prior to its addition to the silicate solution. Gradually additional water is added until a total of 204 grams has been added. The resultant composition has an $SiO_2:Na_2O$ mole ratio of 5.6:1 and is 20 percent solids. Then there are added about 8 grams of a polyfunctional alkoxy silane, e.g., phenyl trimethoxy silane. To this mixture was added 1,290 grams of zinc dust giving composition which after application provides a coating with a dry film zinc content of about 95 percent by weight.

EXAMPLE 9

To the composition of Example 8 is added 125 grams of a 20 percent silica sol to give a vehicle $SiO_2:Na_2O$ mole ratio of 8:1 with the augmented $SiO_2:Na_2O$ mole ratio, an additional 475 grams of zinc dust are added.

EXAMPLE 10

To 100 grams of a 37 percent solution of sodium silicate having a mole ratio of 2.6:1 was added 86 grams of water giving a solids content of 20 percent. Next 16 grams of a polyfunctional alkoxy silane are added, e.g., methyl, phenyl or γ-glycidoxypropyl trimethoxy silane. After complete hydrolysis requiring 3-10 minutes, 55 grams of $SiO_2$ are added as a 20 percent silica sol. To this mixture is added sufficient zinc dust to provide the desired concentration in the coating.

EXAMPLE 11

To 2.1 grams of $Li_2O$ are added 31.8 grams of metasilicic acid prewetted with 60 grams of water. During the dissolving process, water is added in increments sufficiently great to maintain stirring until a total of 111 grams of water have been added. The resultant composition has an $SiO_2:Li_2O$ mole ratio of 6.4 at a solids content of 20 percent. Next 16 grams of methyltrimethoxy silane is added. Complete hydrolysis requires 3-10 minutes. To this mixture are added 550 grams of zinc dust giving a composition yielding a dry film content of about 93 percent zinc.

EXAMPLE 12

To 100 grams of a 35 percent potassium silicate solution with a mole ratio $SiO_2:K_2O$ of 3.3 to 1 are added 4 grams of a 50 percent oligmer of polytetrafluoroethylene in formamide. After complete dispersion, 48 grams of a polyfunctional silicone monomer are added followed by 260 grams of water and 140 grams of a 30 percent silica sol. Finally after complete mixing, 2 grams of hydrophobic silica are added. Into this composition are admixed 1,990 grams of zinc dust to give a composition yielding about 96 percent to zinc dust in the dried film.

EXAMPLE 13

To 100 grams of a 35 percent potassium silicate solution with an $SiO_2:K_2O$ mole ratio of 3.3:1 are added 160 grams of $H_2O$. To this composition 86 grams of a 30 percent silica sol are added followed by the addition of 13.2 grams of a colloidal silica with composition 0.005 $Al_2O_3:SiO_2$. The resultant composition is 21 percent solids with an $SiO_2:K_2O$ mole ratio of 9:1. 1,480 grams of zinc dust are added to give a composition yielding a dry film content of about 95 percent upon application.

What is claimed is:

1. A coatings composition which comprises:
    an aqueous alkali metal silicate solution having an $SiO_2:M_2$ mole ratio of at least 3:1 and
        having dispersed therein colloidal silica in an amount sufficient to raise said mole ratio to 5:1, and
    a water soluble organic silane wetting agent which is a difunctional, trifunctional or quadri-functional hydrocarbyl trialkoxy silane or an oxyhydrocarbyl trialkoxy silane selected from the group consisting of (1) dialkyl dialkoxy silanes, (2) alkyl trialkoxy silanes, (3) aryl trialkoxy silanes, (4) alkoxyalkyl trialkoxy silanes, (5) compounds as specified in (1) through (4) above containing an oxirane oxygen group on the hydrocarbyl portion or the alkoxy portion of such compounds;
    said composition having a pH less than about 11, and having a solids content of less than 35 percent by weight.

2. The coatings composition of claim 1 wherein said colloidal silica has a small amount of aluminum oxide thereon as a surface coating.

3. The coatings composition of claim 1 up to about 10 percent by weight of said colloidal silica is modified with hydrophobic hydrocarbon groups.

4. The coatings composition of claim 1 including a dispersed solid bulking material.

5. The composition of claim 4 wherein said bulking material is selected from the group consisting of stainless steel flakes and aluminum powder.

6. The coatings composition of claim 4 wherein said bulking material comprises zinc dust present in amounts up to 95 percent by dry weight of said composition.

7. The coatings composition of claim 1 containing a material contributing a multivalent metal ion of a metal selected from the group consisting of calcium, magnesium and lead, to coordinate the silicon atoms of said coating.

8. A zinc-modified coating composition comprising:
    a coating vehicle mixture consisting essentially of
        an alkali metal silicate solution having an $SiO_2:M_2$ molar ratio of at least about 3-to-1; and
        colloidal silica dispersed in such solution in an amount sufficient to provide an overall $SiO_2:M_2$ ratio of at least 5-to-1; and
        a difunctional, trifunctional or quadrifunctional water soluble hydrocarbyl polyoxyalkyl silane selected from the group consisting of (1) dialkyl dialkoxy silanes, (2) alkyl trialkoxy silanes, (3) aryl trialkoxy silanes, (4) alkoxyalkyl trialkoxy silanes and (5) compounds as specified in (1) through (4) above containing an oxirane oxygen group on the hydrocarbyl portion or the alkoxy portions of such compounds;
    said mixture having a pH less than about 11, and having a solids content less than 25 percent by weight; and
    zinc dust in an amount to provide up to 96 percent of the dry weight of said composition.

9. The composition of claim 8 wherein the $SiO_2:M_2O$ mole ratio of said vehicle is between 6:1 and 9:1.

10. A fireproof coating composition comprising:
    a coating vehicle mixture consisting essentially of
        an alkali metal silicate solution having an $SiO_2:M_2$ mole ratio between about 3:1 and 4:1, and
        colloidal silica having a surface coating of $Al_2O_3$ in an amount sufficient to provide said mixture with an overall $SiO_2:M_2O$ mole ratio between about 5:1 and 6:1;
        a difunctional, trifunctional or quadrifunctional water soluble hydrocarbyl polyoxyalkyl silane selected from the group consisting of (1) dialkyl dialkoxy silanes, (2) alkyl trialkoxy silanes, (3) aryl trialkoxy silanes, (4) alkoxyalkyl trialkoxy silanes and (5) compounds as specified in (1) through (4) above containing an oxirane oxygen group on the hydrocarbyl portion or the alkoxy portions of such compounds; and
    finely divided mica as a bulking agent.

* * * * *

UNITED STATES PATENT OFFICE
CERTIFICATE OF CORRECTION

Patent No. 3,721,574          Dated March 20, 1973

Inventor(s) Robert H. Schneider and John B. Schutt

It is certified that error appears in the above-identified patent and that said Letters Patent are hereby corrected as shown below:

Column 1, line opposite the "40" in the margin, after "drying" insert --a--.

Column 2,
    line 4, change "composition" to --compositions--;

line 47, (counting from the top), change "tee" to --the--.

Column 3, line 46 (counting from the top), change the formula "$SiO_2:M_2$" to --$SiO_2:M_2O$--;

line 58, change the formula "$SiO_2:M_2$" to --$SiO_2:M_2O$--.

Column 4, line 41 (counting from the top), change the formula "$SiO_2:M_2$" to --$SiO_2:M_2O$--;

line 48, change the formula "$SiO_2:M_2$" to --$SiO_2:M_2O$--.

Column 5, line 53 (counting from the top), change the formula "$SiO_2:M_2$" to --$SiO_2:M_2O$--.

Column 9, line 46 (counting from the top), the formula "$SiO_2:M_2$" should be --$SiO_2:M_2O$--.

Column 10, line 45 (counting from the top), the formula "$SiO_2:M_2$" should be --$SiO_2:M_2O$--;

line 65, the formula "$SiO_2:M_2$" should be --$SiO_2:M_2O$--.

Column 12, 6th line under "Example 1", the formula "$SiO_2:K_2$" should be --$SiO_2:K_2O$--.

Page One

UNITED STATES PATENT OFFICE
CERTIFICATE OF CORRECTION

Patent No. 3,721,574          Dated March 20, 1973

Inventor(s) Robert H. Schneider and John B. Schutt

It is certified that error appears in the above-identified patent and that said Letters Patent are hereby corrected as shown below:

<u>Column 14</u>, the 3rd line under "Example 7", the formula "$SiO_2:K_2$" should be --$SiO_2:K_2O$--.

<u>Column 15</u>, the 3rd line of claim 1, the formula "$SiO_2:M_2$" should be --$SiO_2:M_2O$--.

<u>Column 16</u>, 4th line of claim 8, the formula "$SiO_2:M_2$" should be --$SiO_2:M_2O$--;

8th line of claim 8, the formula "$SiO_2:M_2$" should be --$SiO_2:M_2O$--;

4th line of claim 10, the formula "$SiO_2:M_2$" should be --$SiO_2:M_2O$--.

Signed and sealed this 7th day of August 1973.

(SEAL)
Attest:

EDWARD M. FLETCHER, JR.          R___ D. TEGTMEYER
Attesting Officer                  ___ing Commissioner of Patents